Figure 1:
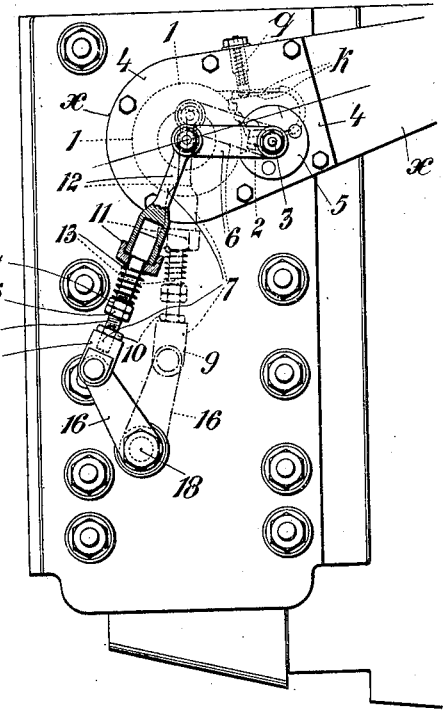

No. 827,532. PATENTED JULY 31, 1906.
H. JOHN.
RATCHET FEEDING MECHANISM.
APPLICATION FILED NOV. 13, 1905.

4 SHEETS—SHEET 1.

Witnesses:

Inventor
Hugo John
By James L. Norris
Atty.

THE NORRIS PETERS CO., WASHINGTON, D. C.

No. 827,532. PATENTED JULY 31, 1906.
H. JOHN.
RATCHET FEEDING MECHANISM.
APPLICATION FILED NOV. 13, 1905.

4 SHEETS—SHEET 2.

Witnesses: Inventor
Hugo John
By James L. Norris
Atty

No. 827,532. PATENTED JULY 31, 1906.
H. JOHN.
RATCHET FEEDING MECHANISM.
APPLICATION FILED NOV. 13, 1905.
4 SHEETS—SHEET 3.
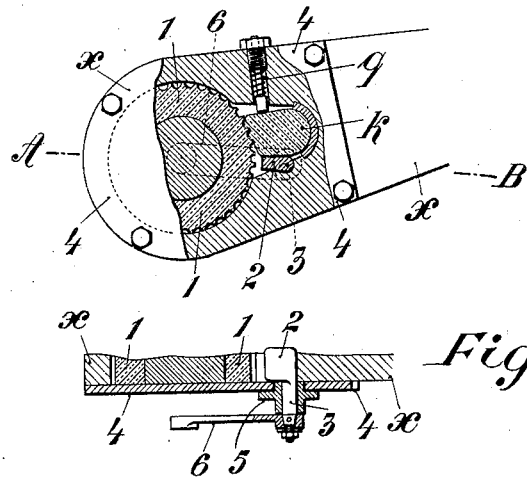
Fig. 6.
Fig. 7.
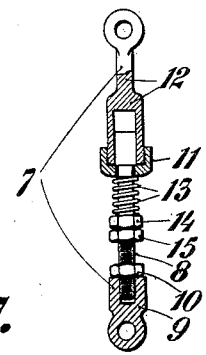
Fig. 8.
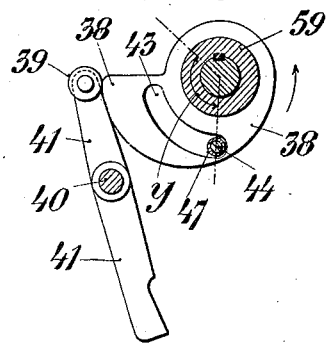
Fig. 9.
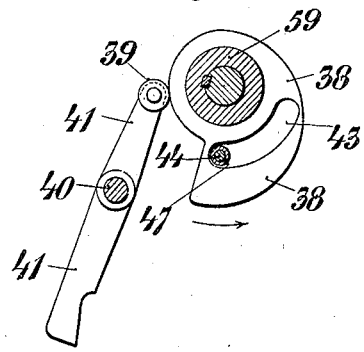
Fig. 10.
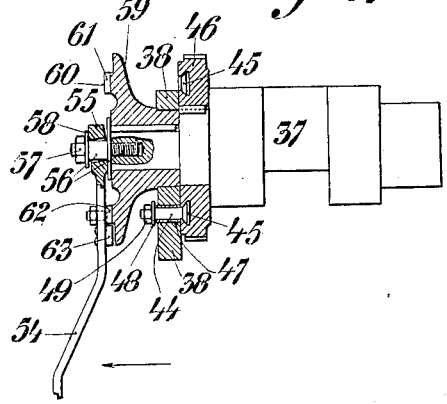
Fig. 11.
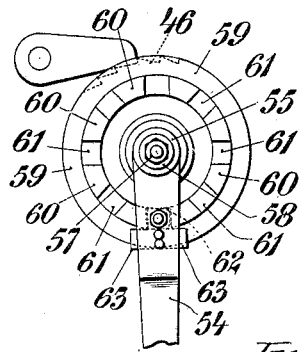
Fig. 12.
Witnesses:
Inventor
Hugo John
By James L. Norris
Atty
THE NORRIS PETERS CO., WASHINGTON, D. C.

No. 827,532. PATENTED JULY 31, 1906.
H. JOHN.
RATCHET FEEDING MECHANISM.
APPLICATION FILED NOV. 13, 1905.

4 SHEETS—SHEET 4.

Witnesses:

Inventor
Hugo John
By James L. Norris
Atty

THE NORRIS PETERS CO., WASHINGTON, D. C.

UNITED STATES PATENT OFFICE.

HUGO JOHN, OF ERFURT, GERMANY.

RATCHET FEEDING MECHANISM.

No. 827,532.   Specification of Letters Patent.   Patented July 31, 1906.

Application filed November 13, 1905. Serial No. 287,133.

*To all whom it may concern:*

Be it known that I, HUGO JOHN, manufacturer, a subject of the King of Prussia, German Emperor, residing at Erfurt, in the Kingdom of Prussia and German Empire, have invented certain new and useful Improvements in or Relating to Ratchet Feeding Mechanism, of which the following is a specification.

My invention relates to mechanism for releasing the pawl of ratchet-gears for large powers of the kind described in the specification of my United States Patent No. 685,145, in which a pivoted lever when moving in one direction drives a circular head by means of a pressure member or pawl, the said head driving the eccentric coupled to the tool, while at the movement in the opposite direction the pressure part or pawl is automatically released, so that the eccentric and the tool remain at rest.

The object of my invention is to release the pawl at any desired point, thus making the eccentric and the tool driven by it entirely independent of the said pawl. The pawl can either remain disengaged for any desired portion of time or be thrown into engagement at regularly-recurring periods.

The advantage of my invention is that during the periods of rest the attendant of the machine can bring the work quietly and safely into another position relatively to the tool and that all the members moved by the pawl, such as the eccentric and tool-rest, together with their bearing and guiding members, remain during these intervals in the position of rest, and therefore do not wear out, and, further, that during those intervals a considerable amount of power is economized.

The release of the pawl can be effected by hand in a simple manner. Ratchet mechanisms and the machines driven by them—such as punches, shears, and presses—are operative when the pawl is thrown into gear by operating a handle, whereas when the pawl is raised or released the tool stops. The release of the pawl can, however, be also effected by the machine itself at any desired point of the travel of the tool and at regular intervals if the handle is operated by means of an element placed on the main shaft of the machine.

Figure 2:
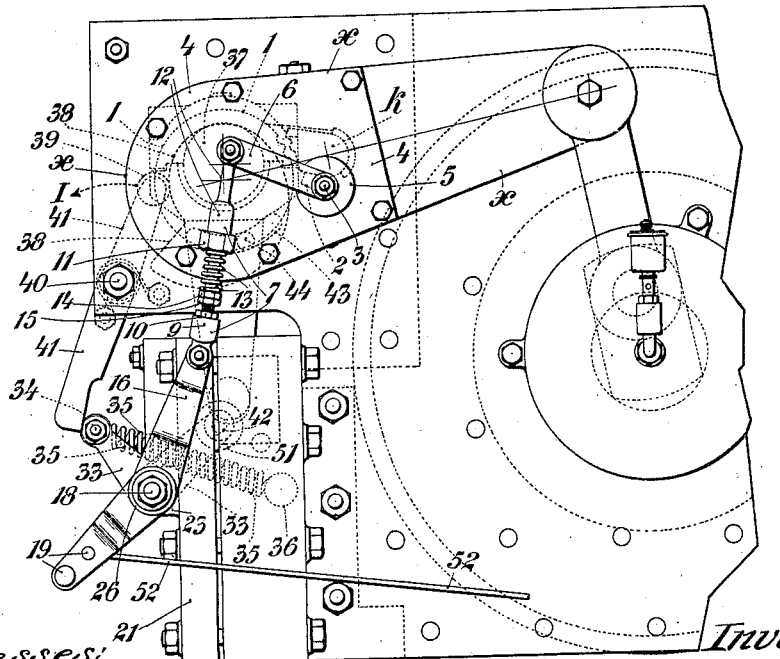
Figure 3:
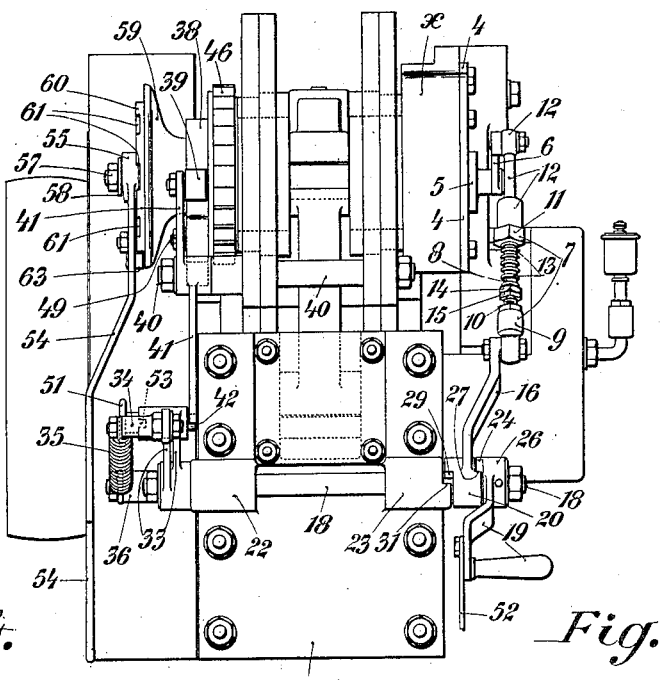
Figures 4, 5:
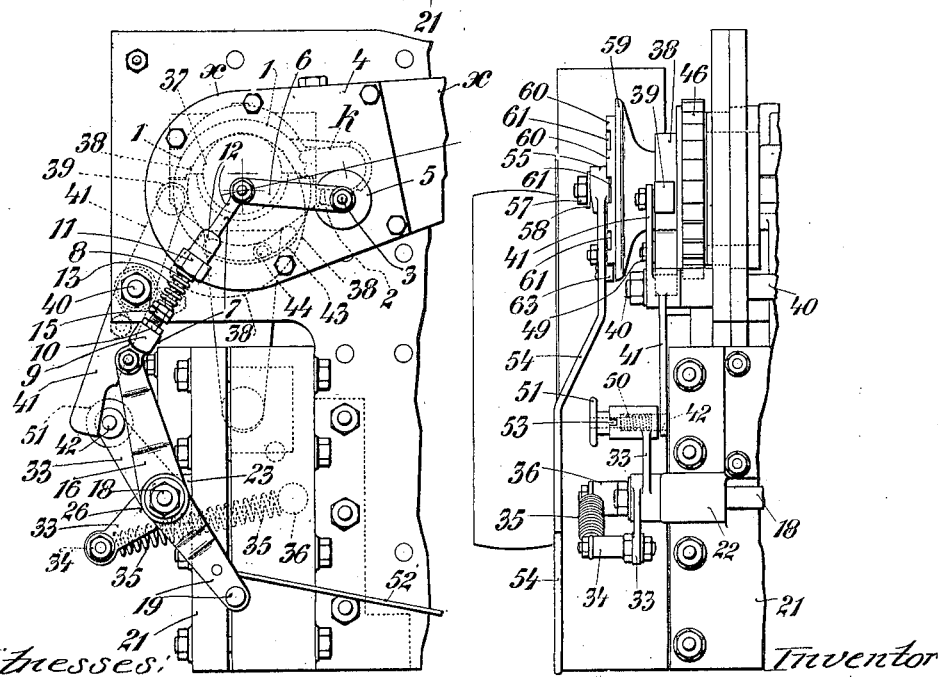
Figure 13:
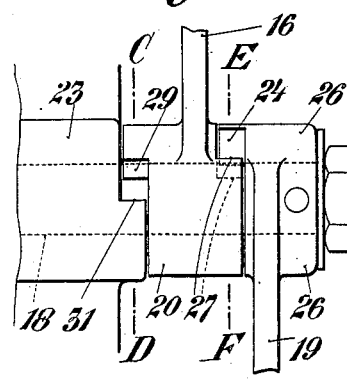
Figure 14:
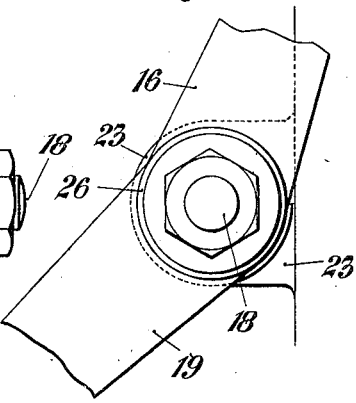
Figure 15:
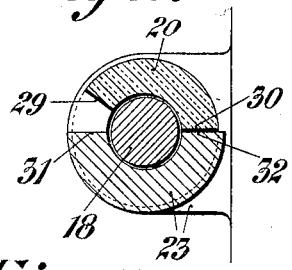
Figure 16:
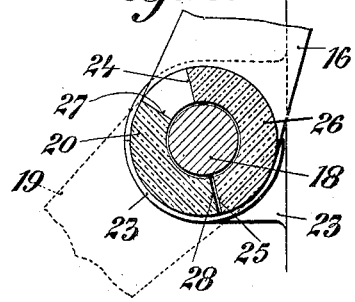
Figure 17:
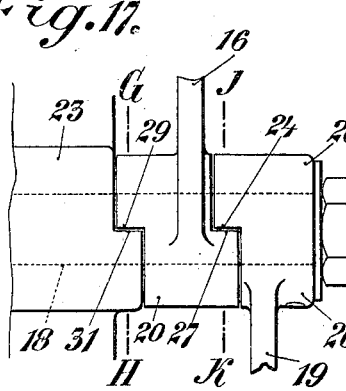
Figure 18:
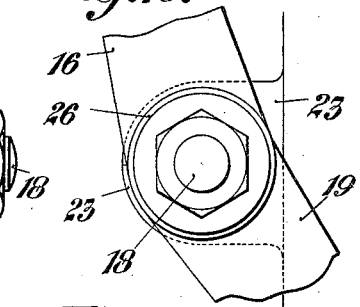
Figure 19:
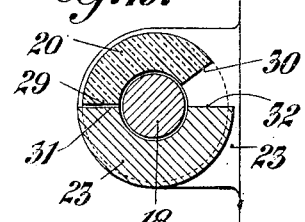
Figure 20:
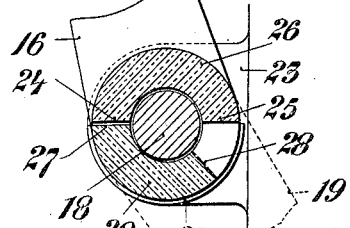

Figure 1 shows the general arrangement. Figs. 2 and 3 are respectively side and front elevation of a construction of the automatic releasing device in its disengaged position. Figs. 4 and 5 are side and front elevation of the same device in its working position. Fig. 6 shows the pivoted lever with the pawl in side elevation, partly in section; Fig. 7, in partial horizontal cross-section on line A B. Fig. 8 shows the expanding and compressible connecting-rod. Figs. 9 and 10 show, respectively, the working position and the position of rest of the cam. Figs. 11 and 12 show the punch as placed on the pitch-circle or how the pitch-circle is marked. Fig. 13 shows a front fragmental view of the hubs in an inoperative position; Fig. 14, a side fragmental view of the same; Fig. 15, a sectional view of Fig. 13 on the line C D; Fig. 16, a sectional view of Fig. 13 on the line E F; Fig. 17, a front fragmental view of the hubs in an operative position; Fig. 18, a side fragmental view of the hubs in an operative position; Fig. 19, a sectional view thereof on the line G H of Fig. 17, and Fig. 20 a sectional view of Fig. 17 on the line J K.

Under the pawl or pressure member $k$, coöperating with the annular head 1, is arranged a pressure-finger 2, mounted on a spindle 3, Figs. 1, 2, 6, and 8. The spindle 3 is guided and supported in a bearing 5, secured to the cover-plate 4 of the oscillating lever. To the front end of the spindle 3 is secured an arm 6, having a boss at its free end which can be rocked to lie in the axis or center of the annular head 1 when the pawl $k$ is thrown into gear, Fig. 4. To the free end of the arm 6 is pivoted pressure-rods 7, comprising a rod 8, screwed to a greater or lesser extent for the purpose of enabling it to be adjusted lengthwise in a block 9 and held in position by a lock-nut 10. The upper end of the adjustable rod is thickened and forms a collar resting against the nut 11 of the upper block 12, in which the upper end of the piston-rod is guided, Figs. 1 and 8. Upon the free adjustable portion of the rod is threaded a pressure-spring 13, the compression of which is adjusted by means of a nut 14 and a lock-nut 15.

The compressed spring 13 has therefore the tendency to keep the upper and the bottom portion of the pressure-rod as widely apart as possible. The bottom end of the rod is pivoted to an arm 16 on a rocking shaft 18, mounted in bearings on the frame and provided with a handle 19. The rod 7 and arm 16 form, as will be seen in Fig. 1, a toggle-lever, the portion 7 being elastic and is longitudinally adjustable. When the toggle-levers 7 and 16 are in the position shown in full lines in Fig. 1, the pressure-finger 2 is not raised, and therefore the pawl $k$ not released, but is in engagement with—that is to say, in operative position relatively to—the annular head 1. In this way when the lever $x$ is oscillating the annular head 1 is caused to participate in the movement in one direction by the pawl $k$, so that the machine is operated. If, however, the toggle-levers 7 and 16 are in the position shown in dotted lines in Fig. 1, then the finger 2 has raised the pawl $k$, and thus released it from the annular head 1.

The rod 7, made elastic by the spring 13 and automatically changing its length, releases the pawl in a perfectly safe manner through the spring 13, which alters the length of the rod, acting as follows: When the arm 16 is brought into the position as in dotted lines, Fig. 1, or from the position shown in Fig. 4 into the position shown in Fig. 2, while the pawl $k$ is still engaging with the grooves on the annular head 1, and therefore cannot be released, the spring 13 is first compressed by the movement of the handle, and consequently the toggle-levers 7 and 16 are slightly shortened, so that the same can pass from one position to the other. The spring 13, however, exerts its force relatively to the weaker spring $q$, the latter normally holding the pawl $k$ in operative position. As soon as the pivoted lever has completed its working stroke and begins its idle stroke the spring then becomes operative, and if an attempt is made to release the pawl $k$ at a moment when the same has not been released on account of the said pawl still being under pressure said spring is compressed for a moment in order to expand again at the next moment when the position of the pivoted lever relatively to the annular head, which position has in the meantime been modified, has brought the pawl from its active operative position to its passive position, thus at once completing the release started by pulling forward the arm 16. It will thus be seen that the object of the buffer-like construction of the rod 7 is to provide an equalizing medium in case there should be an interval, even though a very short one, between the moment when an attempt is made to release the pawl and the moment when such release is possible. The pressure-spring 13 enables, further, the toggle-lever to pass from one end position to the other and also enables those positions to be automatically maintained when they have been once assumed. Moreover, the spring 13 brings about the equalization of the small difference in the length of the toggle-levers 7 and 16 which is caused by the released position of the pawl by the pivot-point of the upper arm swinging through a short arc at each upward and downward movement of the pivoted lever, for at each complete revolution of the crank the spring 13 being compressed once to its minimum length. If, on the contrary, there should be a certain interval of time between the moment of the attempt to throw into engagement and the moment when such engagement takes place, owing to the fact that at the moment of the pushing back of the hand-lever the position of the pivoted lever relatively to the annular head does not admit the engagement of the small projections or teeth of the pawl with the recesses of the annular head, then the pressure-spring $q$ effects the throwing into gear at the next moment, because the pressure-finger 2 becomes independent of the pawl immediately after its engagement has been started or completed by the pulling back of the arm 16. The said pressure-finger is in contact with the pawl $k$, against the bottom surface of which the same bears, during each period of release, Fig. 6.

The release of the pawl in addition to being effected by hand can be made automatically. An arrangement of mechanism for this purpose is shown in Figs. 2 to 5 applied to a machine, Figs. 9 to 20 showing details.

The inner end of the arm 16 is made into a hub 20, which fits loosely upon the spindle 18. The spindle 18 is supported and guided in bearings 22 and 23 on the slide-rest box-cover 21 and has the hand-lever 19 secured to it. The oscillation of the spindle 18 in the bearings 22 and 24 is limited by stops 24 25 of the hub 26 of the hand-lever 19, which coöperate with stops 27 and 28 of the hub 20 of the arm 16, while stops 29 and 30 on the hub 20 and of the arm 16 again coöperate with the stops 31 and 32 on the bearings 23. This takes place in the following manner: The oscillation of the hub 20 of the arm 16 on the spindle 18 is limited by the two stop-faces on the hub 29 in front and 30 at the back coöperating with the stops of the bearings 23 31 in front and 32 at the back. Thus the stop-faces of the hub 20 and of the bearing 23 limit the position of the arm 16, the surfaces 30 and 32 being in contact when the pawl is released, as shown in Fig. 15. On the contrary, the faces 29 and 31 are in contact when the pawl is in gear, Fig. 19. The right-hand face of the hub 20 is provided with the corresponding stops 27 in front and 28 at the back. By means of these stops the hand-lever 19 when moved into its two end positions oscillates the arm 16, the latter moving backward for the purpose of releasing the pawl, when the hand-lever 19 is pulled forward, the faces 25 and 28 being in contact, Fig. 16, and forward for the purpose of throwing the pawl into gear. When the hand-lever 19 is pushed back, the faces 24 and 27, coming into contact, Fig. 20, cause the releasement of the pawl, the faces of the stops 30 and 32, as well as 25 and 28, rest against each other, Figs. 3 and 13 to 16, and when the pawl is thrown into gear the faces 29 and 31, as well as 24 and 27, are in contact, Figs. 17 to 20. The play between the faces of the bearing 23 and the hub 20 determines the angle described by the arm 16 in passing from the releasing to engaging positions.

The play left between the two pairs of stops is necessary in order to provide and to fix the required play for the throwing-into-gear or releasing lever 33, secured to the left-hand end of the spindle 18, for the angle of oscillation of the lever 33 is greater than that of the arm 16. The outer end of one arm of the releasing-lever 33 is connected by a stud 34 to a tension-spring 35, the other end of which is attached at 36 to the machine-frame. During the pulling forward or pushing backward of the hand-lever 19 as soon as the releasing-lever 33 has passed slightly over or under the horizontal position the spring 35 becomes operative for the purpose of pulling the whole releasing and engaging mechanism into either one or the other of its positions and of retaining it in that position.

Automatic release of the pawl $k$ is effected by the releasing-lever 33 being pulled over by the machine itself. On the spindle of the eccentric 37 is mounted a cam-disk 38 in such manner that it can be partly moved, as will be hereinafter described. This cam-disk acts on the roller 39 of a lever 41, pivoted upon a pin 40. During further turning of the eccentric and of the cam-disk the full portion of the cam-disk strikes the upper end of the lever 41 and moves the latter in the direction of the arrow I, Fig. 2, so that the bottom end of the lever 41 strikes a pin 42, projecting from the end of the arm of the bell-crank lever 33 other than that to which the spring 35 is secured, and thus rocks the lever 33, and with it the spindle 18 and all the parts coupled to it, until the arms of the lever 33, to which the spring 35 is secured, pass beyond its dead-center position. The spring 35 then becomes operative and instantaneously completes the release started by the movement of the lever 33. The contact between the roller 39 at the top end of the lever 41 and the bottom end surface of the lever 41 and the pin 42 on the lever 33 is interrupted at the moment when the spring 35 becomes operative. The lever 41 then swings freely about the pin 40. If the cam-disk were to remain in the position in which the release took place, (and that would be the case if the cam-disk were secured to the spindle of the eccentric 37, which is stopped by the release of the pawl,) then at the renewed throwing into gear of the pawl—that is to say, at the movement of the levers operated for the purpose—the bell-crank lever 33 would strike the lever 41 with the pin 42, and the system of rods for throwing into gear could not, therefore, be brought into their position.

The lever 41 makes this movement possible, of course, only when the cam-disk has released the same. For that reason the cam-disk is not secured to the spindle of the eccentric, but is provided with a long slot 43 and is driven by a pin or stud which is mounted with its dovetailed foot in a corresponding recess 45 in the left-hand front face of the ratchet-wheel 46, in which it can be tightened. The stud 44 is provided with a roller 47, a washer 48, and a nut 49 and passes through the slot 43 of the cam-disk, Figs. 9 to 11. After the full portion or projection of the cam-disk has moved the lever 41 and the bottom end of the latter acted upon the pin 42 of the releasing-lever 33, so that the said lever is turned and the spring 35 becomes operative and at once completes the release, this takes place before the full portion of the cam-disk 38 has passed the roller 39. The rising portion of the curve on the cam-disk is in that case nearly horizontal, Fig. 9, and the disk has therefore the tendency to come with its center of gravity into a position of stable equilibrium—that is to say, to come into the position shown in Figs. 2 to 5 and 10. This is possible, because the disk is provided with the correspondingly long slot 43, engaged by the stud 44 with its roller 47. After the pawl is again brought into gear the cam-disk remains in the position of rest until the stud 44, with its roller 47, has moved the whole length of the slot 43 for the purpose of again driving the disk 38.

The pin 42 is a spring-pin acted upon by a spring 50. By pulling its head 51 it can be drawn into the boss of the lever 33 to such an extent that the lever 41 can pass in front of it. When the pin is drawn in, the lever 41 cannot act upon the lever 33. The tool works then in a continuous manner until its working is stopped either by the return of the pin 42 into its operative position or by the direct release of the pressure-finger 2 by the pulling of the hand-lever 19. The hand-lever 19 can be brought into the operative position by means of a rope 52, connected to a treadle. In its operative position the pin 42 is held by turning the head 51 to the extent of ninety degrees after the pulling out, and bringing a projection at the circumference of the pin 42 into engagement with a recess 53.

The cam-disk 38, which can to a certain extent move on the eccentric, may also be utilized for releasing the pawl at any point of travel of the tool. The number of the different positions depends on the number of recesses in the annular head. The adjustment to the different strokes of the tool is effected by correspondingly shifting the driving-stud 44 within the angle $y$, Fig. 9. In this way it is rendered possible—for instance, in a punching-machine—to adjust the punch to any desired thickness of the material to be perforated and to release it directly above it, so that the attendant requires little time and is perfectly safe in finding the marked pitch-circle or the marks. For such adjustment of the stud 44 there is provided a groove 45 on the ratchet-wheel 46. It can be effected in such manner that the tool effects the whole downward stroke from the upper end position and then the whole upward stroke and is then released, or this may be made to take place at a point below the upper end position.

In order finally to place the punch on the pitch-circle or on the marks, the machine is provided with a punch-setting lever 54, the upper end of which is formed into a boss 55, which fits upon, with suitable play, the stud 56 of the eccentric 37 and is held on the stud 56 by a nut 57, with a washer 58, Figs. 11 and 12. Between the boss of the lever 54 and the cam-disk 38 there is secured to the spindle of the eccentric 37 the setting-disk 59, provided on its front face with projections 60 in such manner that between each two projections there is a space or notch 61. To the spindle of the lever 54 is secured a projection 62, which can engage with one of the notches 61. When the lever 54 is forced into one of the notches 61, it is possible to swing the lever to any desired extent, and thus rotate the eccentric and set the upper tool on the work. In order to prevent the setting-lever from rotating when the machine is working, there is provided below the projection 62 on the spindle of the lever an arc-shaped spring 63, which presses the lever 54 away from the setting-disk 59. The lever 54 remains, therefore, hanging idle during the working of the machine.

The releasing devices described can also be applied to pawl-gears.

Having now particularly described and ascertained the nature of my said invention and in what manner the same is to be performed, I declare that what I claim is—

1. A releasing device of the class described, comprising a pawl, a finger having an arm supported below the pawl, and yieldable toggle-levers connecting the said arm to the frame of the machine for holding the said arm fixedly in a shifted position and to prevent an intermediate release of the pawl.

2. In a releasing device of the class described, an annular head, a pawl coöperative therewith, a pressure-finger arranged below the pawl and having an arm, a rocking shaft mounted in bearings in the machine, and yieldable toggle-levers connected to the first-mentioned arm and to the arm of the machine and adapted, when actuated, for releasing and engaging the pawl.

3. In a releasing device of the class described, a pawl, yieldable means for maintaining the same in normal position, a pressure member mounted below the said pawl and having an arm, yieldable toggle-levers connected to said arm for actuating the same to move the pawl into and out of engagement, and mechanism for actuating the said toggle-levers.

4. In a device of the class described, an annular head, an oscillatory lever for imparting movement in one direction to the annular head, a pawl mounted in said lever and normally in engagement with the annular head, a pressure member below the said pawl and having an arm, toggle-levers connected to said arm, yieldable means interposed between the toggle-levers for automatically adjusting the latter, a spring coöperative with said pawl for maintaining the same normally in engagement, and mechanism coöperative with the toggle-levers for actuating the same to cause the releasing of the pawl and for returning the same to its normal operative position when shifted in opposite directions.

5. In a device of the class described, an annular head, an oscillatory lever coöperative therewith for moving the same in one direction, a pawl normally in engagement with the annular head, a pressure-spring in contact with the said pawl for retaining the same in normal engagement, a pressure-finger supported below the said pawl and having an arm, a rocking shaft having an arm, levers slidable within one another having the one terminals thereof connected to the respective arms, a spring fixed to one of the said levers and in contact with the other of said levers for automatically adjusting the same when moved in different positions, said levers forming a toggle connection for the arms, means for operating the rocking shaft for actuating the toggle-levers to move the same in several directions, and means for regulating the last-mentioned means.

6. In a device of the class described, a circular head movable in one direction having an oscillatory arm coöperative therewith for moving the same, a pawl in engagement with the circular head, means for normally retaining the said pawl in engagement, a pressure-finger supported below the pawl and having a spindle, an arm on the spindle, a rocking shaft journaled in the machine and having an arm, automatically-adjustable levers connected to the respective arms and forming a toggle connection, mechanism for actuating the rocking shaft to move the levers in opposite directions for releasing the pawl, and means for regulating said mechanism for controlling the automatic releasing of the pawl.

In testimony whereof I have hereunto set my hand in presence of two subscribing witnesses.

HUGO JOHN.

Witnesses:
ERNST EBERHARDT,
OSKAR SACHSE.